(12) United States Patent
Sakai et al.

(10) Patent No.: US 6,440,186 B1
(45) Date of Patent: Aug. 27, 2002

(54) POLISHING COMPOSITION AND POLISHING METHOD EMPLOYING IT

(75) Inventors: Kenji Sakai; Hiroshi Asano; Tadahiro Kitamura; Katsuyoshi Ina, all of Aichi (JP)

(73) Assignee: Fujimi Incorporated, Nishikasugai-gun (JP)

( * ) Notice: Subject to any disclaimer, the term of this patent is extended or adjusted under 35 U.S.C. 154(b) by 0 days.

(21) Appl. No.: 09/928,996

(22) Filed: Aug. 15, 2001

(30) Foreign Application Priority Data

Aug. 24, 2000 (JP) ........................................ 2000-253349

(51) Int. Cl.⁷ .............................. C09G 1/02; C09G 1/04
(52) U.S. Cl. .............................. 51/308; 51/307; 51/309; 106/3; 438/692; 438/693
(58) Field of Search .......................... 51/307, 308, 309; 106/3; 438/692, 693; 216/89

(56) References Cited

U.S. PATENT DOCUMENTS

| | | | | |
|---|---|---|---|---|
| 5,770,095 A | * | 6/1998 | Sasaki et al. ............... | 438/692 |
| 5,954,997 A | * | 9/1999 | Kaufman et al. ........... | 252/79.1 |
| 6,063,306 A | * | 5/2000 | Kaufman et al. ........... | 252/79.1 |
| 6,136,711 A | * | 10/2000 | Grumbine et al. .......... | 438/692 |
| 6,303,049 B1 | * | 10/2001 | Lee et al. ................... | 252/79.1 |

FOREIGN PATENT DOCUMENTS

| | | |
|---|---|---|
| EP | 0 846 742 | 6/1998 |
| EP | 1 020 488 | 7/2000 |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition comprising:
(a) an abrasives
(b) a compound to form a chelate with copper ions
(c) a compound to provide a protective layer-forming function to a copper layer,
(d) hydrogen peroxide, and
(e) water, wherein the abrasive of component (a) has a primary particle size within a range of from 50 to 120 nm.

9 Claims, No Drawings

POLISHING COMPOSITION AND POLISHING METHOD EMPLOYING IT

The present invention relates to a polishing composition to be used for polishing substrates for semiconductors, photomasks and various memory hard disks, particularly to a polishing composition useful for polishing for planarization of the surface of device wafers in e.g. semiconductor industry, and a polishing method employing such a composition.

More particularly, the present invention relates to a polishing composition which is highly efficient and useful for forming an excellent polished surface in the polishing step of semiconductor devices to which so-called chemical mechanical polishing technology is applied, in the processing of device wafers, and a polishing method employing such a composition.

Progress of so-called high technology products including computers has been remarkable in recent years, and parts to be used for such products, e.g. devices such as ULSI, have been developed for high integration and high speed, year after year. Along with such progress, the design rule for semiconductor devices has been progressively refined year after year, the depth of focus in a process for producing devices tends to be shallow, and planarization required for the pattern-forming surface tends to be increasingly severe.

Further, to cope with an increase in resistance of the wiring due to refinement of the wiring, it has been studied to employ copper instead of tungsten or aluminum, as the wiring material.

By its nature, copper is highly susceptible to etching, and accordingly, it requires the following process. Namely, after forming wiring grooves and vias on an insulating layer, copper wirings are formed by sputtering or plating, and then an unnecessary copper layer deposited on the insulating layer is removed by chemical mechanical polishing (hereinafter referred to as CMP) which is a combination of mechanical polishing and chemical polishing.

However, in such a process, it may happen that copper atoms will diffuse into the insulating layer to deteriorate the device properties. Therefore, for the purpose of preventing diffusion of copper atoms, it has been studied to provide a barrier layer on the insulating layer having wiring grooves or vias formed. As a material for such a barrier layer, tantalum metal, tantalum nitride or a tantalum compound (hereinafter will generally be referred to as a tantalum-containing compound) is most suitable also from the viewpoint of the reliability of the device and is expected to be employed mostly in the future.

Accordingly, in such a CMP process for a semiconductor device containing such a copper layer and a tantalum-containing compound, firstly the copper layer as the outermost layer and then the tantalum-containing compound layer as the barrier layer, are polished, respectively, and polishing will be completed when it has reached the insulating layer of e.g. silicon dioxide or monofluoro silicon oxide (SiOF). As an ideal process, it is desired that by using only one type of a polishing composition, the copper layer and the tantalum-containing compound layer are uniformly removed by polishing in a single polishing step, and polishing will be completed certainly when it has reached the insulating layer. However, copper and a tantalum-containing compound are different in their hardness, chemical stability and other mechanical properties and accordingly in the processability, and thus, it is difficult to adopt such an ideal polishing process. Accordingly, the following two step polishing process, i.e. a polishing process divided into two steps, is being studied.

Firstly, in the first step polishing (hereinafter referred to as the first polishing), using a polishing composition capable of polishing a copper layer at a high efficiency, the copper layer is polished using e.g. a tantalum-containing compound layer as a stopper until such a tantalum-containing compound layer is reached. Here, for the purpose of not forming various surface defects such as recesses, erosion, dishing, etc., on the copper layer surface, polishing may be terminated immediately before reaching the tantalum-containing compound layer i.e. while a copper layer still slightly remains. Then, in the second step polishing (hereinafter referred to as the second polishing), using a polishing composition capable of polishing mainly a tantalum-containing compound layer at a high efficiency, the remaining thin copper layer and the tantalum-containing compound layer are continuously polished using the insulating layer as a stopper, and polishing is completed when it has reached the insulating layer.

The polishing composition to be used in the first polishing is required to have a property such that it is capable of polishing the copper layer at a high stock removal rate without forming the above-mentioned various surface defects (such as recesses) on the copper layer surface, which can not be removed by the second polishing.

With respect to such a polishing composition for polishing a copper layer, for example, JP-A-7-233485 (Prior Art 1) discloses a polishing liquid for a copper type metal layer, which comprises at least one organic acid selected from the group consisting of aminoacetic acid (hereinafter referred to as glycine) and amidesulfuric acid, an oxidizing agent and water, and a method for producing a semiconductor device using such a polishing liquid. If this polishing liquid is used for polishing a copper layer, a relatively high stock removal rate is obtainable. It is believed that copper atoms on the copper layer surface are converted to copper ions by the action of the oxidizing agent, and the copper ions are taken into a chelate compound, whereby a high stock removal rate can be obtained.

However, as a result of experiments conducted by the present inventors, it has been found that when a polishing liquid merely containing an abrasive, glycine and hydrogen peroxide, like the polishing liquid of the above-mentioned Prior Art 1, is used for polishing a copper layer having a pattern formed, many pits (dents) will form in the copper wiring. This phenomenon is frequently observed particularly at a fine wiring of 0.3 $\mu$m or less. This may be explained such that defects or impurities are present during formation of the copper layer at the fine wiring, and such weak layer portions are attacked by a chemical or mechanical action during the polishing, whereby pits will be formed. Accordingly, it is desired to further improve the uniformity of the layer formation by optimizing the layer-forming conditions in the preparation of semiconductor devices. On the other hand, it is strongly desired to develop a polishing composition which does not form pits during the polishing.

The present invention has been made to solve such a problem, and it is an object of the present invention to provide a polishing composition which is capable of preventing formation of pits in the copper wiring in a CMP process in the production of a semiconductor device comprising at least a copper layer and a tantalum-containing compound layer, and a polishing method employing it.

The present invention provides a polishing composition comprising:

(a) an abrasive,
(b) a compound to form a chelate with copper ions
(c) a compound to provide a protective layer-forming function to a copper layer, (d) hydrogen peroxide, and
(e) water,
wherein the abrasive of component (a) has a primary particle size within a range of from 50 to 120 nm.

The present invention provides the polishing composition, wherein the abrasive of component (a) is silicon dioxide.

The present invention provides the polishing composition, wherein the abrasive of component (a) is fumed silica or colloidal silica.

The present invention provides the polishing composition, wherein the content of the abrasive of component (a) is within a range of from 5 to 50 g/l based on the composition.

The present invention provides the polishing composition, wherein the compound to form a chelate with copper ions of component (b), is at least one member selected from the group consisting of glycine, α-alanine, serine, quinaldic acid, hystidine and derivatives thereof, and its content is within a range of from 5 to 50 g/l based on the composition.

The present invention provides the polishing composition, wherein the compound to provide a protective-layer forming function to a copper layer, of component (c), is at least one member selected from the group consisting of benzotriazole and derivatives thereof, and its content is within a range of 0.0002 to 0.002 mol/l based on the composition.

The present invention provides the polishing composition, wherein the content of the hydrogen peroxide of component (d) is within a range of from 0.03 to 1 mol/l based on the composition.

The present invention provides a polishing method which comprises polishing a semiconductor device having at least a layer of copper and a layer of a tantalum-containing compound formed on a substrate, with the polishing composition.

Now, the present invention will be described in further detail. However, it should be understood that the following description is intended to facilitate the understanding of the present invention, and by no means restrict the present invention.

Abrasive

The abrasive as one component of the polishing composition of the present invention serves to perform mechanical polishing in the CMP processing and has a function to mechanically remove a brittle layer formed on the surface to be polished. As such an abrasive, it is commonly known to use silicon dioxide, aluminum oxide, cerium oxide, titanium oxide, zirconium oxide, silicon carbide, silicon nitride, etc. Among these abrasives, one or more may be used. In the present invention, it is preferred to use silicon dioxide. Further, fumed silica and colloidal silica or either one of them, may be used, and colloidal silica is most preferred.

Further, the abrasive has a primary particle size within a range of from 50 to 120 nm, preferably from 70 to 100 nm. The most important point in the present invention is that when the primary particle size of the abrasive is within the above range, such is effective for suppressing pits on the copper wiring. The primary particle size of from 50 to 120 nm is a particle size which means an intermediate between a colloidal state and a non-colloidal state. According to an observation by the present inventors, in a completely colloidal state, i.e. when the primary particle size of the abrasive is smaller than 50 nm, the surface of the abrasive will be in a very active state, and such an active surface is believed to induce pits on the copper wiring. As the primary particle size increases, the colloidal nature decreases, and the activity of the particle surface tends to be small. Consequently, pits tend to hardly develop. On the other hand, if the primary particle size is too large, i.e. when the primary particle size of the abrasive exceeds 120 nm, the dispersibility of the abrasive tends to be poor, and consequently, scratching is likely to be led, and handling at the time of supplying the slurry tends to be difficult.

The primary particle size of the abrasive according to the present invention is a primary particle size calculated from a value of a specific surface area measured by a nitrogen adsorption method (BET method). To obtain a primary particle size from the value of a specific surface area measured by the BET method, such a primary particle size is calculated by the mathematical formula (A).

$$D = 6/\rho \cdot S \tag{A}$$

wherein D is the primary particle size (nm), $\rho$ is the specific gravity (g/cm$^3$) of the abrasive, and S is the specific surface area (m$^2$/g) measured by the BET method.

Further, the content of the abrasive in the polishing composition is usually from 5 to 50 g/l, preferably from 10 to 30 g/l, more preferably from 15 to 25 g/l. If the content of the abrasive is too small, the mechanical polishing power decreases, whereby the stock removal rate of the copper layer is likely to decrease. On the other hand, if the content of the abrasive is too large, the mechanical polishing power increases, and the rate of polishing the tantalum-containing compound layer tends to be too high and difficult to control.

Compound to Form a Chelate with Copper Ions

The compound to form a chelate with copper ions, as one component of the polishing composition of the present invention, is characterized in that it contains at least one carboxyl group and a nitrogen atom, which are located at the α-position. The carboxyl group and the nitrogen atom located at the α-position will form a chelate with copper, and thereby accelerate polishing of the copper layer. In the present invention, it is at least one member selected from the group consisting of glycine, α-alanine, serine, quinaldic acid, hystidine and derivatives thereof.

The content of the compound to form a chelate with copper ions, in the polishing composition, is usually from 0.04 to 0.2 mol/l, preferably from 0.06 to 0.12 mol/l, based on the composition. If the content is less than 0.04 mol/l, the stock removal rate of the copper layer tends to be low, such being undesirable. On the other hand, if it exceeds 0.2 mol/l, the stock removal rate of the copper layer tends to be too high and difficult to control, such being undesirable.

Compound to Provide a Protective Layer-forming Function to a Copper Layer

The compound to provide a protective layer-forming function to a copper layer, as one component of the polishing composition of the present invention, has a role to protect the copper layer during and/or after the polishing, and consequently, it suppresses dishing or formation of recesses in the copper wiring and has a function as a corrosion-preventing agent to suppress corrosion of the copper. Such a compound to provide a protective-layer forming function to a copper layer, is at least one member selected from the group consisting of benzotriazole and its derivatives. The derivatives may, for example, be benzoimidazole, triazole, imidazole and tolyltriazole.

The content of the compound to provide a protective layer-forming function to a copper layer, in the polishing composition, is usually from 0.0002 to 0.002 mol/l, preferably from 0.0003 to 0.001 mol/l, based on the composition. If the content is less than 0.0002 mol/l, the surface of the copper layer after polishing tends to be susceptible to corrosion, such being undesirable. On the other hand, if it exceeds 0.002 mol/l, the protective layer-forming function to the copper tends to be strong, whereby non-uniformity in polishing is likely to be led, or the stock removal rate of the copper layer tends to be excessively low, such being undesirable.

Hydrogen Peroxide

Hydrogen peroxide as one component of the polishing composition of the present invention, is one functioning as an oxidizing agent. And, hydrogen peroxide has a characteristic such that one having a sufficient oxidizing power to oxidize the copper layer and containing no metal ion as an impurity, can readily be available, and thus, it is particularly suitable for the polishing composition of the present invention.

The content of hydrogen peroxide in the polishing composition is usually from 0.03 to 1 mol/l, preferably from 0.1 to 0.5 mol/l, based on the composition. If the content of hydrogen peroxide is too small, or too large, the stock removal rate of the copper layer tends to decrease.

Water

Water as one component of the polishing composition of the present invention is preferably one having impurities reduced as far as possible, so that the above-mentioned respective components can precisely perform their roles. Namely, water is preferably distilled water, or one having impurity ions removed by an ion exchange resin and having suspended matters removed by a filter.

Polishing Composition

The polishing composition of the present invention is prepared by mixing, dissolving or dispersing the above-described respective components, i.e. the abrasive having a primary particle size within a range of from 50 to 120 nm, the compound to form a chelate with copper ions, the compound to provide a protective layer-forming function to a copper layer and hydrogen-peroxide, in water. Here, a method for mixing, dissolving or dispersing is optional. For example, stirring by a vane-type stirrer or ultrasonic dispersion may be employed. By such a method, soluble components will be dissolved and insoluble components will be dispersed, whereby the composition will be a uniform dispersion.

Further, at the time of preparing the above polishing composition, a pH-adjusting agent to adjust the pH, various surfactants and other additives may be incorporated as the case requires, for the purpose of securing the safety or maintenance of the quality of the product, or depending upon the type of the object to be polished, the polishing conditions and other requirements for polishing operation.

The pH-adjusting agent is used to improve the stability of the polishing composition, to improve the safety in use or to meet the requirements of various regulations. As a pH-adjusting agent to be used to lower the pH of the polishing composition of the present invention, hydrochloric acid, nitric acid, sulfuric acid, chloroacetic acid, tartaric acid, succinic acid, citric acid, malic acid, malonic acid, various fatty acids, various polycarboxylic acids, etc., may be employed. On the other hand, a pH-adjusting agent to be used for the purpose of raising the pH, potassium hydroxide, sodium hydroxide, ammonia, ethylenediamine, piperazine, polyethyleneimine, etc., may be employed. The polishing composition of the present invention is not particularly limited with respect to the pH, but it is usually adjusted to pH 3 to 10.

The surfactant is used to increase the dispersibility of the abrasive or to adjust the viscosity or the surface tension of the polishing composition. The surfactants which may be used in the present invention, include, for example, a dispersing agent, a wetting agent, a thickener, a defoaming agent, a foaming agent, a water repellent, etc. The surfactant to be used as a dispersing agent, may usually be a sulfonate, phosphate, carboxylate or nonionic surfactant.

For the preparation of the polishing composition of the present invention, there is no particular restriction as to the order of mixing the various additives or the mixing method.

The polishing composition of the present invention may be prepared, stored or transported in the form of a stock solution having a relatively high concentration, so that it may be diluted for use at the time of actual polishing operation. The above-mentioned range for the concentration is one for the actual polishing operation. Needless to say, in the case of adopting such a method of diluting at the time of actual use, the stock solution during the storage or transportation is a solution having a higher concentration. From the viewpoint of handling efficiency, it is preferred to prepare the composition in such a highly concentrated form.

Further, hydrogen peroxide has a characteristic such that it decomposes in the presence of metal ions, ammonium ions or an amine. Accordingly, it is advisable to add and mix it to the polishing composition immediately prior to the actual use for polishing operation. Such decomposition of hydrogen peroxide can be suppressed by incorporating a carboxylic acid or an alcohol. Namely, it is possible to obtain such an effect by the above-mentioned pH-adjusting agent. However, such decomposition will be influenced also by the storage environment, and there is a possibility that part of hydrogen peroxide undergoes decomposition due to a temperature change during transportation or due to formation of a stress. Accordingly, it is preferred to carry out the mixing of hydrogen peroxide immediately before polishing.

Polishing Method

The polishing method of the present invention comprises polishing a semiconductor device having at least a layer of copper and a layer of a tantalum-containing compound formed on a substrate, with a polishing composition comprising the above-described respective components i.e. an abrasive having a primary particle size within a range of from 50 to 120 nm, a compound to form a chelate with copper ions, a compound to provide a protective layer-forming function to a copper layer, hydrogen peroxide and water.

This polishing method provides a high stock removal rate of the copper layer and a low stock removal rate of the tantalum-containing compound layer, whereby it provides a high selectivity ratio (the ratio of the stock removal rate of the copper layer to the stock removal rate of the tantalum-containing compound layer is referred to as a "selectivity ratio"), and the polished surface has excellent smoothness. Further, by specifying the primary particle size of the abrasive strictly, it is possible to obtain a normal polished surface without formation of pits on the copper wiring on the substrate.

Such a polishing mechanism may be explained as follows. Firstly, by the action of hydrogen peroxide, the copper layer surface will be oxidized. Then, the compound to form a chelate with copper ions will dissolve in the polishing composition in the form of a copper chelate by a combined action with the abrasive. Further, for suppression of pits on the copper wiring on the substrate, by specifying the particle size of the abrasive to be a relatively large particle size in a non-colloidal state, the surface activity of the abrasive will be lowered, and an excessive chemical reaction to the copper layer surface will be suppressed. It is believed that by these actions, it is possible to realize the high stock removal rate of the copper layer without forming pits on the copper wiring.

Now, the practical embodiments of the present invention will be described in detail with reference to Examples.

However, it should be understood that the present invention is by no means restricted to such specific Examples.

EXAMPLES 1 to 9 and COMPARATIVE EXAMPLES 1 to 6

Contents and Preparation of Polishing Compositions

Colloidal silica having various primary particle sizes as shown in Table 1, as an abrasive, glycine, hystidine or α-alanine, as a compound to form a chelate with copper ions (additive (b)), benzotriazole (hereinafter referred to as "BTA") as a compound to provide a protective layer-forming function to a copper layer (additive (c)), and hydrogen peroxide, were mixed with water so that they will be blended in such ratios as shown in Table 1, to obtain polishing compositions of Examples 1 to 9 and Comparative Examples 1 to 6. Here, in Examples 1 to 9, the primary particle sizes of the abrasives were within a range of from 50 to 120 nm, and in Comparative Examples 1 to 6, the primary particle sizes of the abrasives were outside the above range. Further, as hydrogen peroxide, a commercially available 31% aqueous solution was employed, and it was mixed immediately prior to polishing.

Polishing pad:
Laminated polishing pad made of polyurethane (IC-1000/Suba400, manufactured by Rodel Inc., U.S.A.)
Polishing pressure: 4 psi
Table rotational speed: 50 rpm
Feed rate of the polishing composition: 250 cc/min
Rotational speed of the carrier: 50 rpm
For the end point of polishing, the end point was detected from the torque current of the carrier, and then, overpolishing corresponding to 10% in terms of time, was carried out, whereupon the polishing was terminated.

After the polishing, the wafer was sequentially washed and dried, and the copper wiring of 0.2 μm was observed by an optical microscope, whereby evaluation of the polished surface condition after the polishing was carried out in accordance with the following standards. The obtained results are shown in Table 1.
⊚: Excellent with no substantial formation of pits.
○: A small number of small and shallow pits are observed, but within an allowable range.
P: Pits are observed.
S: Scratches are observed.

As is evident from Table 1, in Comparative Example 1, 3, or 5 wherein the primary particle size of the abrasive is

TABLE 1

| | Abrasive | | Additive (b) | | Additive (c) | | Hydrogen peroxide | Evaluation of polished surface |
|---|---|---|---|---|---|---|---|---|
| | Particle size (nm) | Amount (g/l) | Type | Amount (mol/l) | Type | Amount (mol/l) | Amount (mol/l) | |
| Ex. 1 | 50 | 20 | Glycine | 0.09 | BTA | 0.0005 | 0.3 | ○ |
| Ex. 2 | 70 | 20 | Glycine | 0.09 | BTA | 0.0005 | 0.3 | ⊚ |
| Ex. 3 | 90 | 20 | Glycine | 0.09 | BTA | 0.0005 | 0.3 | ⊚ |
| Ex. 4 | 100 | 20 | Glycine | 0.09 | BTA | 0.0005 | 0.3 | ⊚ |
| Ex. 5 | 120 | 20 | glycine | 0.09 | BTA | 0.0005 | 0.3 | ○ |
| Ex. 6 | 70 | 20 | Hystidine | 0.12 | BTA | 0.0005 | 0.3 | ⊚ |
| Ex. 7 | 90 | 20 | Hystidine | 0.12 | BTA | 0.0005 | 0.3 | ⊚ |
| Ex. 8 | 70 | 20 | α-alanine | 0.15 | BTA | 0.0005 | 0.3 | ⊚ |
| Ex. 9 | 90 | 20 | α-alanine | 0.15 | BTA | 0.0005 | 0.3 | ⊚ |
| Comp. Ex. 1 | 30 | 20 | Glycine | 0.09 | BTA | 0.0005 | 0.3 | P |
| Comp. Ex. 2 | 150 | 20 | Glycine | 0.09 | BTA | 0.0005 | 0.3 | S |
| Comp. Ex. 3 | 30 | 20 | Hystidine | 0.12 | BTA | 0.0005 | 0.3 | P |
| Comp. Ex. 4 | 150 | 20 | Hystidine | 0.12 | BTA | 0.0005 | 0.3 | S |
| Comp. Ex. 5 | 30 | 20 | α-alanine | 0.15 | BTA | 0.0005 | 0.3 | P |
| Comp. Ex. 6 | 150 | 20 | α-alanine | 0.15 | BTA | 0.0005 | 0.3 | S |

Additive (b): A compound to form a chelate with copper ions
Additive (c): A compound to provide a protective layer-forming function to a copper layer
BTA: Benzotriazole
P: Pits are observed.
S: Scratches are observed.

Polishing Tests

Using each of the polishing compositions of Examples 1 to 9 and Comparative Examples 1 to 6, polishing of a layer-formed side of an object to be polished, was carried out under the following conditions.
Object to be polished:
A patterned wafer having a copper wiring with a minimum wire width of 0.2 μm formed by electroplating
Polishing machine:
One side CMP polishing machine (AVANTI472, manufactured by.Speedfam-Ipec Co.)

outside the range of from 50 to 120 nm i.e. smaller than 50 nm, the surface of the abrasive is in a very active state, whereby pits formed on the polished surface, and in Comparative Example 2, 4 or 6 wherein the primary particle size of the abrasive is larger than 120 nm, the dispersibility of the abrasive is poor, and scratches were formed on the polished surface, and in either case, polishing with high efficiency can not be attained. Whereas, in Examples 1 to 9 wherein the primary particle size of the abrasive is within a range of from 50 to 120 nm, particularly in Examples other than Examples 1 and 5, wherein the primary particle size of the abrasive is in a preferred range (70 to 100 nm), it is evident that in each case, a normal polished surface having no pits or scratches can be obtained, and polishing with high efficiency can be attained.

EXAMPLES 10 to 27 and COMPARATIVE EXAMPLES 7 to 14

Contents and Preparation of Polishing Compositions

Colloidal silica having a primary particle size of 90 nm, as an abrasive, glycine, as a compound to form a chelate with copper ions, BTA, as a compound to provide a protective layer-forming function to a copper layer, and hydrogen peroxide, were mixed with water so that they were blended in such ratios as identified in Table 2, to obtain polishing compositions of Examples 10 to 27 and Comparative Examples 7 to 14. Here, in Comparative Example 7 or 8, the content of the abrasive is outside the range of from 5 to 50 g/l, based on the composition, in Comparative Example 9 or 10, the content of glycine (a compound to form a chelate with copper ions) is outside the range of from 0.04 to 0.2 mol/l, based on the composition, in Comparative Example 11 or 12, the content of benzotriazole (a compound to provide a protective layer-forming function to a copper layer) is outside the range of from 0.0002 to 0.002 mol/l, based on the composition, and in Comparative Example 13 or 14, the content of hydrogen peroxide is outside the range of from 0.03 to 1 mol/l, based on the composition. Further, as hydrogen peroxide, a commercially available 31% aqueous solution was employed, and it was mixed immediately before polishing.

Polishing Tests

Using each of the polishing compositions of Examples 10 to 35, polishing of the layer-formed side of an object to be polished, was carried out under the following conditions:
Object to be polished:
  A silicon wafer having a copper layer formed by sputtering, and a silicon wafer having a tantalum layer formed by sputtering
Polishing machine:
  One side CMP polishing machine (AVANTI472, manufactured by Speedfam-Ipec Co.)
Polishing pad:
  Laminated polishing pad made of polyurethane (IC-1000/Suba400, manufactured by Rodel Inc., U.S.A.)
Polishing pressure: 4 psi (about 27.5 kPa)
Plate rotational speed: 50 rpm
Feed rate of the polishing composition: 250 cc/min
Carrier rotational speed: 50 rpm
Polishing time:
  The copper layer-formed wafer was mounted and polished for one minute, and then it was changed to the tantalum layer-formed wafer, which was likewise polished for one minute.

After the polishing, the wafers were sequentially washed and dried, and the layer thicknesses were measured by a sheet resistance detecting method, and the stock removal rates were obtained from the differences in the layer thicknesses as between before and after the polishing. The obtained results are shown in Table 2.

As is evident from Table 2, if the content of the abrasive is smaller than the above range, as in Comparative Example

TABLE 2

| | Abrasive (g/l) | Glycine (mol/l) | Benzo-triazole (mol/l) | Hydrogen peroxide (mol/l) | Stock removal rate of copper (Å/min) | Stock removal rate of tantalum (Å/min) |
|---|---|---|---|---|---|---|
| Ex. 10 | 5 | 0.09 | 0.0005 | 0.3 | 2405 | 7 |
| Ex. 11 | 10 | 0.09 | 0.0005 | 0.3 | 3774 | 8 |
| Ex. 12 | 15 | 0.09 | 0.0005 | 0.3 | 4194 | 8 |
| Ex. 13 | 25 | 0.09 | 0.0005 | 0.3 | 5082 | 10 |
| Ex. 14 | 30 | 0.09 | 0.0005 | 0.3 | 5546 | 10 |
| Ex. 15 | 50 | 0.09 | 0.0005 | 0.3 | 6485 | 50 |
| Ex. 16 | 20 | 0.04 | 0.0005 | 0.3 | 4331 | 11 |
| Ex. 17 | 20 | 0.06 | 0.0005 | 0.3 | 5457 | 11 |
| Ex. 18 | 20 | 0.12 | 0.0005 | 0.3 | 7432 | 10 |
| Ex. 19 | 20 | 0.2 | 0.0005 | 0.3 | 9012 | 10 |
| Ex. 20 | 20 | 0.09 | 0.0002 | 0.3 | 6457 | 10 |
| Ex. 21 | 20 | 0.09 | 0.0003 | 0.3 | 5909 | 11 |
| Ex. 22 | 20 | 0.09 | 0.001 | 0.3 | 2445 | 10 |
| Ex. 23 | 20 | 0.09 | 0.002 | 0.3 | 2188 | 11 |
| Ex. 24 | 20 | 0.09 | 0.0005 | 0.03 | 5495 | 11 |
| Ex. 25 | 20 | 0.09 | 0.0005 | 0.1 | 8141 | 11 |
| Ex. 26 | 20 | 0.09 | 0.0005 | 0.3 | 5407 | 11 |
| Ex. 27 | 20 | 0.09 | 0.0005 | 0.5 | 6069 | 10 |
| Comp. Ex. 7 | 3 | 0.09 | 0.0005 | 1.0 | 2150 | 6 |
| Comp. Ex. 8 | 70 | 0.09 | 0.0005 | 0.3 | 7559 | 81 |
| Comp. Ex. 9 | 20 | 0.02 | 0.0005 | 0.3 | 2415 | 10 |
| Comp. Ex. 10 | 20 | 0.3 | 0.0005 | 0.3 | 12067 | 9 |
| Comp. Ex. 11 | 20 | 0.09 | 0.0001 | 0.3 | 6954 | 10 |
| Comp. Ex. 12 | 20 | 0.09 | 0.003 | 0.3 | 1402 | 10 |
| Comp. Ex. 13 | 20 | 0.09 | 0.0005 | 0.02 | 2803 | 10 |
| Comp. Ex. 14 | 20 | 0.09 | 0.0005 | 2.0 | 3911 | 10 |

7, the stock removal rate of the copper layer tends to be low, and polishing treatment can not be carried out in a short time, whereby it tends to be difficult to increase the productivity. Further, if the content of the abrasive is larger than the above range as in Comparative Example 8, the stock removal rate of not only the copper layer but also the tantalum-containing compound layer tends to be high, whereby it will be difficult to control the polishing of the tantalum-containing compound layer.

Further, if the content of glycine is smaller than the above range as in Comparative Example 9, the stock removal rate of the copper layer tends to be low as in Comparative Example 7, and if it exceeds the above range as in Comparative Example 10, the stock removal rate of the copper layer tends to be too large, and it tends to be difficult to control the polishing.

Further, if the content of benzotriazole is smaller than the above range as in Comparative Example 11, the stock removal rate of the copper layer tends to be high, but the polished surface after the polishing tends to be corroded, whereby the smoothness tends to be poor, i.e. the surface is chemically polished more than necessary, whereby improvement of the quality can not be attained, although this is not shown in Table 2. Further, if the content of benzotriazole is larger than the above range as in Comparative Example 12, the etching action to the copper layer tends to be controlled too much, and the stock removal rate tends to be low.

Further, if the content of hydrogen peroxide is smaller or larger than the above range as in Comparative Example 13 or 14, the stock removal rate of the copper layer tends to be small, and the polishing treatment can hardly be carried out in a short time, whereby it tends to be difficult to increase the productivity.

Whereas, in Examples 10 to 27 wherein the abrasive, glycine, benzotriazole and hydrogen peroxide are within the above ranges, in each case, the stock removal rate of the copper layer is high, and the stock removal rate of the tantalum-containing compound layer is low. Namely, Examples 10 to 27 present polishing compositions which provide high selectivity ratios, whereby polishing excellent in the smoothness of the polished surface after the polishing can be attained.

Further, by using each of the polishing compositions of Examples 10 to 27, a patterned wafer having a copper wiring with a minimum wire width of 0.2 µm formed by electroplating, was polished, whereby no pits or scratches were observed on the copper layer surface in each case. Thus, it is evident that each of the polishing compositions of Examples 10 to 27 is capable of preventing formation of pits in the copper wiring, whereby polishing with high efficiency can be attained.

As described in the foregoing, the polishing composition of the present invention comprises (a) an abrasive, (b) a compound to form a chelate with copper ions, (c) a compound to provide a protective layer-forming function to a copper layer, (d) hydrogen peroxide and (e) water, wherein the abrasive of component (a) has a primary particle size within a range of from 50 to 120 nm.

It is thereby possible to obtain a polishing composition which is capable of preventing formation of pits in a copper wiring in a CMP process of a semiconductor device comprising at least a copper layer and a tantalum-containing compound layer.

In the polishing composition of the present invention, the content of the abrasive of component (a) is within a range of from 5 to 50 g/l based on the composition, whereby a polishing composition can be obtained which is capable of carrying out mechanical polishing of the copper layer in a short period of time while suppressing mechanical polishing of the tantalum-containing compound layer.

In the polishing composition of the present invention, the compound to form a chelate with copper ions, of component (b), is at least one member selected from the group consisting of glycine, α-alanine, serine, quinaldic acid, hystidine and derivatives thereof, and its content is within a range of from 0.04 to 0.2 mol/l, based on the composition, whereby it is possible to obtain a polishing composition which is capable of carrying out proper polishing of the copper layer.

In the polishing composition of the present invention, the compound to provide a protective layer-forming function to a copper layer, of component (c), is at least one member selected from the group consisting of benzotriazole and its derivatives, and its content is within a range of from 0.0002 to 0.002 mol/l, based on the composition, whereby it is possible to obtain a polishing composition which provides the optimum polishing function by accelerating polishing of the copper layer and at the same time providing a protective layer-forming function.

In the polishing composition of the present invention, the content of hydrogen peroxide of component (d) is within a range of from 0.03 to 1 mol/l based on the composition, whereby a polishing composition can be obtained which is capable of polishing in a short time and which is capable of providing an optimum chemical polishing of a copper layer.

The polishing method of the present invention is a method for polishing a semiconductor device having at least a layer made of copper and a layer made of a tantalum-containing compound, on a substrate, with the above-mentioned polishing composition, whereby in its CMP process, the stock removal rate of the copper layer will be high, the stock removal rate of the tantalum-containing compound layer is low, whereby a high selectivity ratio can be provided, and a polished surface excellent in smoothness can be obtained, and at the same time, by strictly specifying the primary particle size of the abrasive, it is possible to produce a semiconductor device with a normal polished surface without formation of pits on the copper wiring on the substrate.

What is claimed is:
1. A polishing composition comprising:
   (a) an abrasive in an amount range of 5 to 50 g/l based on the composition,
   (b) a compound to form a chelate with copper ions in an amount range of from 0.04 to 0.2 mol/l based on the composition,
   (c) a compound to provide a protective layer-forming function to a copper layer which is at least one compound selected from the group consisting of benzotriazole and derivatives thereof, and its content is in an amount range of 0.0002 to 0.002 mol/l based on the composition,
   (d) hydrogen peroxide in an amount range of from 0.03 to 1 mol/l based on the composition, and
   (e) water, wherein said abrasive has a primary particle size within a range of from 50 to 120 mn.

2. The polishing composition according to claim 1, wherein said abrasive is silicon dioxide.

3. The polishing composition according to claim 1, wherein said abrasive is fumed silica or colloidal silica.

4. The polishing composition according to claim 1, wherein said compound to form a chelate with copper ions is at least one compound selected from the group consisting of glycine, α-alanine, serine, quinaldic acid, hystidine and derivatives thereof.

5. A polishing method which comprises: polishing a semiconductor device having at least a layer of copper and a layer of a tantalum-containing compound formed on a substrate with the polishing composition as defined in claim 1.

6. The polishing composition according to claim 1, wherein said abrasive has a primary particle size within a range of 70 to 100 nm.

7. The polishing composition according to claim 1, wherein said abrasive is in an amount range of from 15 to 25 g/l based on the composition.

8. The polishing composition according to claim 1, wherein said derivatives are selected from the group consisting of benzoimidazole, triazole, imidazole and tolyltriazole.

9. The polishing composition according to claim 1, wherein said hydrogen peroxide is in an amount range of from 0.1 to 0.5 mol/l based on the composition.

* * * * *